(12) United States Patent
Mekonnen et al.

(10) Patent No.: US 11,581,820 B1
(45) Date of Patent: Feb. 14, 2023

(54) MULTI-LEVEL INVERTER WITH MIXED DEVICE TYPES

(71) Applicant: Imagen Energy, LLC, Milwaukee, WI (US)

(72) Inventors: Ezana T. Mekonnen, Oak Creek, WI (US); Jerry D. Thunes, Greenfield, WI (US); Adel Nasiri, Lexington, SC (US)

(73) Assignee: Imagen Energy, LLC, Wauwatosa, WI (US)

( * ) Notice: Subject to any disclaimer, the term of this patent is extended or adjusted under 35 U.S.C. 154(b) by 123 days.

(21) Appl. No.: 17/139,536

(22) Filed: Dec. 31, 2020

Related U.S. Application Data

(60) Provisional application No. 62/975,666, filed on Feb. 12, 2020.

(51) Int. Cl.
*H02M 7/483* (2007.01)
*H02M 1/38* (2007.01)
*H02M 7/5387* (2007.01)

(52) U.S. Cl.
CPC ......... *H02M 7/4835* (2021.05); *H02M 1/385* (2021.05); *H02M 7/53871* (2013.01)

(58) Field of Classification Search
CPC . H02M 7/4834; H02M 1/385; H02M 7/53871
See application file for complete search history.

(56) References Cited

U.S. PATENT DOCUMENTS

| | | | | |
|---|---|---|---|---|
| 9,318,974 B2 * | 4/2016 | Yoscovich | ............ | H02M 1/126 |
| 9,515,617 B2 * | 12/2016 | Høyerby | ............... | H03F 3/2173 |
| 9,941,813 B2 * | 4/2018 | Yoscovich | .......... | H02M 7/4837 |
| 10,153,685 B2 * | 12/2018 | Yoscovich | ............ | H02M 1/143 |
| 10,536,073 B2 * | 1/2020 | Young | ..................... | H02M 7/10 |

* cited by examiner

*Primary Examiner* — Adolf D Berhane
(74) *Attorney, Agent, or Firm* — Gehrke & Associates, SC; Lisa M Gehrke

(57) ABSTRACT

Provided is a novel multi-level inverter with mixed device types and methods of controlling same. This novel multi-level inverter topology and control method allows the use of high frequency switching devices for controlled PWM switching, while also using lower frequency switching devices for directional switches. This combination of high frequency PWM switching devices with low frequency directional switching devices allows a cost reduction without a significant performance degradation.

1 Claim, 17 Drawing Sheets

MULTI-LEVEL INVERTER WITH MIXED DEVICE TYPES

CROSS REFERENCE TO RELATED APPLICATION

This application claims priority to provisional application U.S. 62/975,666 filed on Feb. 12, 2020, which is herein incorporated by reference.

GOVERNMENT LICENSE RIGHTS

This invention was made with government support under EE-AR0000909 awarded by the United States Department of Energy. The government has certain rights in the invention.

FIELD OF INVENTION

The present disclosure relates to multi-level inverters and related control strategies.

BACKGROUND OF THE INVENTION

Currently multi-level voltage source power inverters and converters utilize a multiplicity of designs including active neutral-point-clamped (ANPC) topology, and various control strategies for the ANPC topology. The use of multi-level ANPC topology and related control strategies offers advantages in power loss distribution and reduced device voltage ratings.

Converters and inverters are classified into levels relating to the number of voltage stages in the power structure, such as, two-level inverter, three-level inverter, four level inverter, five-level inverter or multi-level inverters. Although higher-level inverters offer better harmonics, lower switch loss, and reduced voltage stress than two-level inverters, two-level inverter and three-level inverter are considered to be mainstays of the industry because the higher level inverters are more difficult to implement due to their complexity and resulting higher cost. One reason for the increased complexity and cost of higher level inverters is the increased complexity and cost of components used in multilevel inverters.

When converting direct current (DC) to an alternating current (AC), or AC to DC, multi-level voltage source power inverters and converters utilize a plurality of switches. Silicon carbide metal-oxide-semiconductor field-effect transistors (SiC MOSFETs) are frequently used when high voltage and high frequency is involved.

ANPC topology can be implemented with any of a variety of power switching devices including IGBTs, IGCTs, MCTs and MOSFETs, and preferably SiC MOSFETs which switch faster in comparison to other switches resulting in lower switching losses. Higher switching frequencies allow a reduction in size and cost of some power structure components (eg. heatsinks, filter inductors and capacitors) as well as higher fundamental frequencies.

Each level of a three-level ANPC topology includes an upper and a lower bus structure each of which is normally implemented with devices that are one-half of the voltage rating of the full bus voltage. Since in some situations full voltage rated devices cost more than multiple lower voltage devices in the multi-level topology. Therefore, it is desirable to reduce costs by utilizing multiple lower voltage devices rather than full voltage rated devices.

Investigation into multi-level inverter failures has found that in certain cases, excessive bus voltage is inadvertently applied to some of the switching devices creating overvoltage stress resulting in reduced lifetime or failure of the device. More specifically, it was found that device stress, or even failure, happens if latencies occur when one of the directional switches changes state before all of the multi-level switches can appropriately block the full bus voltage. Cases in which these latencies are more prominent occur when a stop transition or a fault occurs. When this happens, all of the switching devices are turned off at the same time and all of the switching latencies also occur at the same time. This disclosure addresses these different latencies and provides methods to mitigate this overvoltage stress.

Pulse width modulation (PWM) switching is a method of reducing average power loss when creating an electrical signal and is often used in converter and inverter operation. As disclosed in the present application, PWM switching, as incorporated in ANPC multi-level topology, offers the possibility to use high frequency switching devices (eg. SiC MOSFETs) for controlled PWM switching, while also using lower frequency switching devices (e.g. IGBTs) for the directional switches. This combination of high frequency PWM switching devices with low frequency directional switching devices allows a cost reduction without a significant performance degradation. Additional multi-level topologies may also be added in series to provide very high voltage inverters for use in medium voltage power structures. This mixed device implementation allows a high performance, robust, multi-level high voltage inverter design that has a cost advantage over implementations that use high frequency devices for all of the switches in the ANPC topology. Other neutral-point-clamped topologies may also benefit from using high frequency switching devices (eg. SiC) for PWM operation and low frequency devices (eg. IGBT) for the directional switching including NPC1 and NPC2.

The use of mixed switching device types result in different latencies for each of the different device types with a significantly greater chance of switching device overvoltage stress than designs that utilize the same type of switching device for all of the switches, the present disclosure provides a method of controlling mixed device multilevel inverter topologies to correct this problem.

BRIEF DESCRIPTION OF FIGURES

The present invention is explained in the Detailed Description and is better understood by referring to the accompanying Figures, in which like reference indicators are used to designate like elements, where.

DETAILED DESCRIPTION OF THE INVENTION

The present invention is described in terms of specific embodiments which illustrate the invention and should not be construed as limiting. Moreover, as known by persons skilled in the art, the present invention is not limited by what has been particularly shown or described herein including each and every combination of characteristic features.

Use of the article "a", "an" or "the" preceding an element does not exclude the presence of a plurality of such elements. Use of the verbs "to comprise", "to include", "to be composed of", or any other variant, as well as their respective conjugations, does not exclude the presence of elements other than those stated.

For the purpose of this specification, the terms high frequency switching devices and low frequency switching devices are used as a comparison to each other. More specifically, although SCRs, IGCTs, MCTs, BJTs, IGBTs are generally considered to be the low frequency switching devices and MOSFETs, SiC MOSFETS and GaAs transistors are generally considered to be high frequency devices, their use as either a low frequency device or a high frequency device is defined by how the frequency capability of the specific devices compare to each other. For example, although both BJTs and IGBTs are generally considered to be lower frequency devices, since BJTs have lower frequency capability than IGBTs, BJTs would be considered as the low frequency devices and IGBTs as the high frequency devices in this specific configuration. Likewise, IGBTs would be considered as the low frequency devices and MOSFETs as the high frequency devices if they are used in combination. It is also possible to have a slower frequency device and a high frequency switching device in the same device family, such as when both devices are IGBTs.

Figure 1:
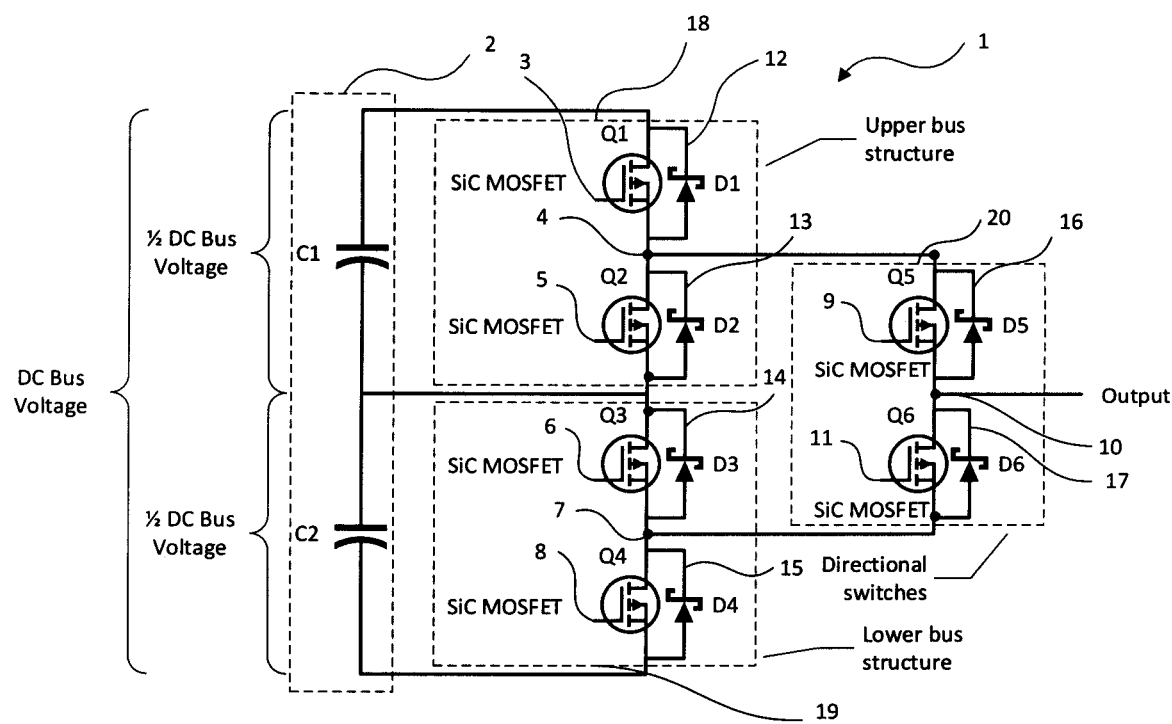
FIG. 1 is a circuit diagram of a conventional ANPC topology implemented with MOSFETs.

Referring now to the Figures, FIG. 1 provides a schematic 1 of one phase of a conventional active neutral point clamped (ANPC) three level (3L) inverter. A first leg of the three level inverter shows two input voltages across capacitor bank 2 includes C1 and C2 connected in series where each voltage is ½ of the DC Bus Voltage and together comprises the DC Bus Voltage. A second leg of the inverter shows four switching devices 3, 5, 6, and 8 with corresponding diodes respectively 12, 13, 14, and 15. A third leg of the inverter shows two switching devices 9, and 11 with corresponding diodes respectively 16, and 17. Switching devices 3 and 5 comprise the upper bus structure 18. Switching devices 6 and 8 comprise the lower bus structure 19. Switching devices 9 and 11 comprise the directional switches 20 and provide the output voltage 10. All the switching devices are depicted as silicon-carbide (SiC) MOSFETs with associated SiC Schottky diodes. The ANPC structure allows switching device implementations where the switching device rated voltage is less than the full DC Bus Voltage, in this case rated for ½ DC Bus Voltage providing a cost advantage over full bus voltage rated switching devices.

More specifically, the upper bus structure for each leg is comprised of two SiC MOSFETs 3 and 5 in series with each other and each SiC MOSFET includes a corresponding anti-parallel SiC Schottky diodes respectively 12 and 13. The lower bus structure is comprised of two SiC MOSFETs 6 and 8 in series with each other and each SiC MOSFET includes a corresponding anti-parallel SiC Schottky diodes respectively 14 and 15. The upper bus structure 18 is connected in series with the lower bus structure 19 with the bottom of Q2 connecting to the top of Q3. The directional switches for each leg are comprised of two SiC MOSFETs 9 and 11 in series with each other and each SiC MOSFET including a corresponding anti-parallel SiC Schottky diodes respectively 16 and 17.

The top of the upper bus structure 18 is connected to the top of the capacitor bank 2 connecting to the top of C1. The bottom of the upper bus structure is connected to the mid-point of the capacitor bank 2 that is the mid-point of the C1 and C2 connection. The top of the lower bus structure 19 is connected to the top of the mid-point of the capacitor bank 2 that is the mid-point of the C1 and C2 connection. The bottom of the lower bus structure is connected to the bottom of the capacitor bank 2 that is the bottom of C2. The top of the directional switches 20 is connected to the mid-point of the upper bus structure 4 switches that is the mid-point of the Q1 3 and Q2 5 connection. The bottom of the directional switches 20 is connected to the midpoint of the lower bus structure 7 switches that is the mid-point of the Q3 6 and Q4 8 connection. The mid-point of the directional switches 20 is the output connection 10.

Figure 2:
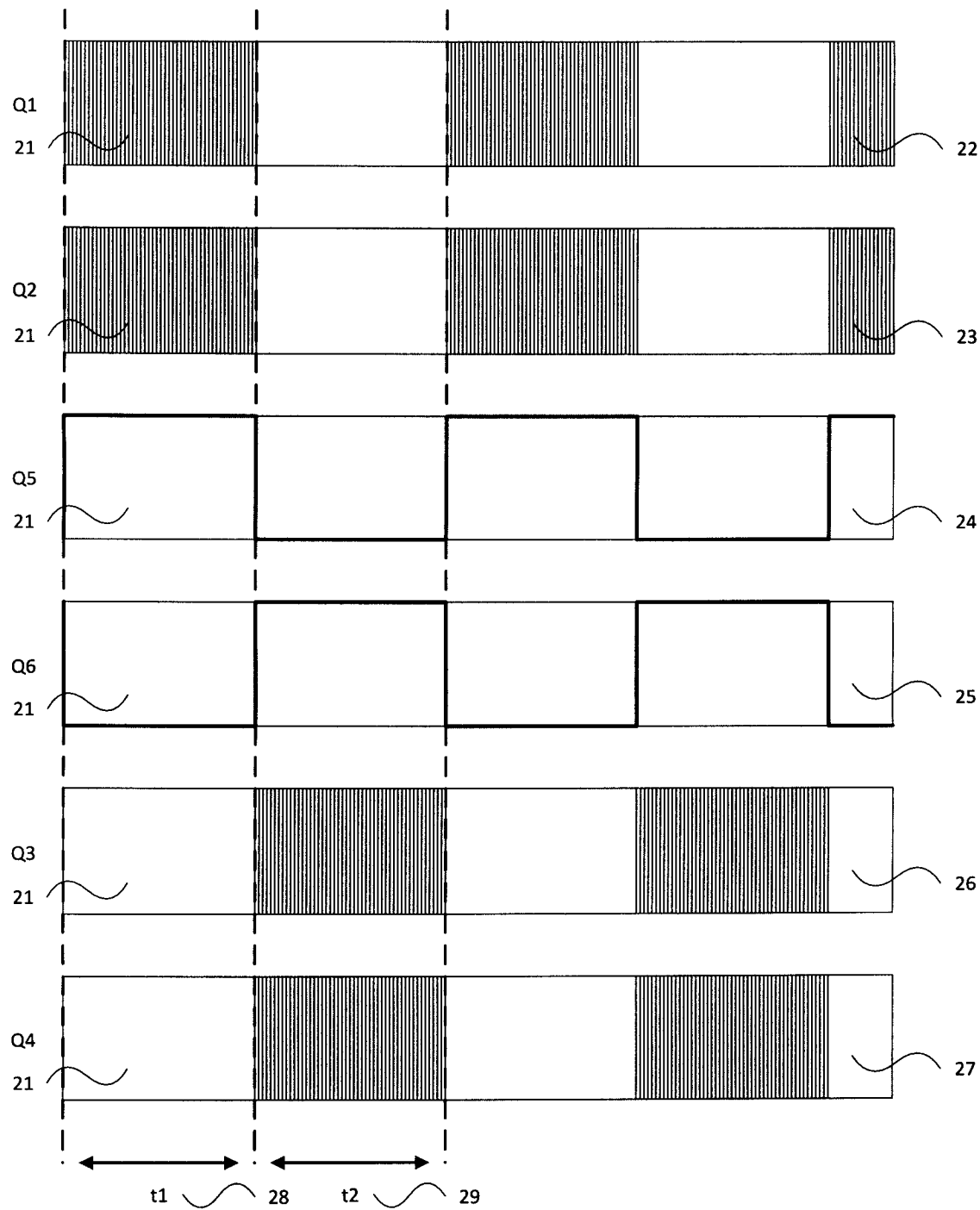
FIG. 2 is a graph illustration of a conventional ANPC topology switching device gating pattern.

FIG. 2 illustrates the conventional operation of the three-level ANPC shown in FIG. 1 where the switching operation corresponds to the switching device logical gate operation. In FIG. 2, the logical switching for devices Q1, Q2 Q3, Q4, Q5, and Q6, 21 are shown. Switching device Q1 3 operation is complementary to switching device Q2 5. The switching pattern for Q1 22 has active PWM switching during period t1 28 and is inhibited from switching (inactive (off)) during switching period t2 29. The switching pattern for Q2 23 has active PWM switching during period t1 28 and is inhibited from switching (inactive (off)) during switching period t2 29. The switching pattern for Q1 and Q2 are complementary.

Switching device Q3 6 operation is complementary to switching device Q4 8. The switching pattern for Q3 26 has active PWM switching during period t2 29 and is inhibited from switching (inactive (off)) during switching period t1 28. The switching pattern for Q4 27 has active PWM switching during period t2 29 and is inhibited from switching (inactive (off)) during switching period t1 28. The switching pattern for Q3 and Q4 are complementary.

Switching device Q5 9 operation is complementary to switching device Q6 11. The switching pattern for Q5 24 has active directional switching during period t1 28 and is inhibited from switching (inactive (off)) during switching period t2 29. The switching pattern for Q6 25 has active directional switching during period t2 29 and is inhibited from switching (inactive (off)) during switching period t1 28. As shown in FIG. 2, the switching patterns for the directional switches Q5 and Q6 24 and 25 are complementary and based on a fundamental output frequency, typically a frequency much lower than the PWM switching frequency. As the PWM frequency is increased, total harmonic current distortion decreases for a given operating point and control bandwidth is often increased.

A conventional ANPC topology switching pattern has a positive ½ Bus Voltage output associated with C1 based on the upper bus structure active PWM 22, 23 during period t1 28 with respect to the capacitor bank 2 mid-point. This ANPC topology switching pattern has a negative ½ Bus Voltage output associated with C2 based on the lower bus structure active PWM 26, 27 during period t2 29 with respect to the capacitor bank 2 mid-point.

Figure 3:
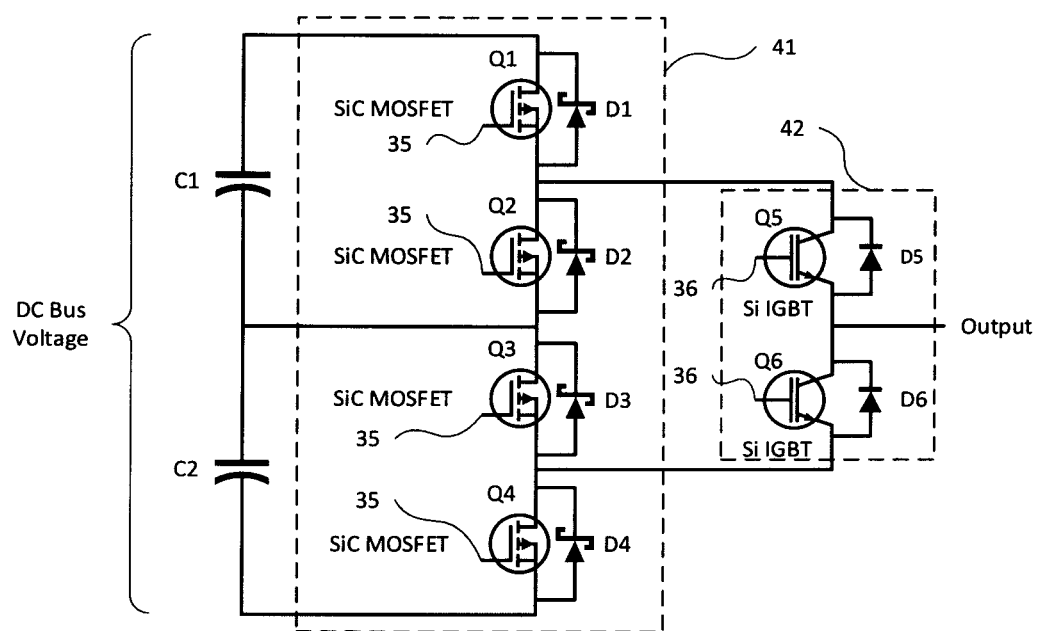
FIG. 3 is a circuit diagram of mixed device type ANPC topology.

In contrast to the conventional ANPC topology and switching patterns shown in FIGS. 1 and 2, FIG. 3 discloses a multilevel inverter topology that incorporates mixed device types. Referring now to the mixed device multilevel inverter disclosed in FIG. 3, the PWM based switching of the upper and lower bus structures and fundamental based switching of the directional switches allow implementation of the mixed device. In this case, the upper and lower bus structure devices 41 are selected to switch at a high PWM frequency and the directional devices 42 are switched at a lower frequency based on the output fundamental frequency. In addition, FIG. 3 shows the upper and lower switching devices (Q1, Q2, Q3 and Q4) as SiC MOSFETs 35 and the directional switching devices (Q5 and Q6) as Si IGBTs 36 noting that SiC MOSFETs have an inherently higher switching frequency capability than Si IGBTs for similar power levels. This implementation maintains the high frequency PWM advantages of SiC MOSFET switching devices (including reduced losses, higher fundamental frequency capability, reduced filter sizes and costs, etc.) while providing a lower cost solution as compared to using SiC MOSFETs for all of the switching devices. This configuration also maintains the advantages of the ANPC topology of reduced switching losses and reduced directional switching device voltage requirements, in this case based on ½ bus voltage.

Using mixed switching device types results in different deadtime requirements, to avoid shoot-through, dependent on device type. For example, if the required deadtime for an IGBT is 2.5 microseconds and the required deadtime for a SiC MOSFET is 400 nanoseconds, then this results in the SiC MOSFETs deadtime requirement being 6.25 times less than the IGBT deadtime requirement. In this case, the SiC MOSFET deadtime would need to be increased from 400 nanoseconds to 2.5 microseconds during IGBT commutations.

Many factors affect the required switching device deadtime including, but not limited to, device characteristics, device operating point (such as temperature, voltage and current), gate drive design, control latencies and power structure design including tolerances for all of these variations. Together these and other factors determine the required deadtime for the switching devices. Using IGBTs with SiC free-wheeling diodes typically further reduces that deadtime requirement for these switching devices.

Figure 4:
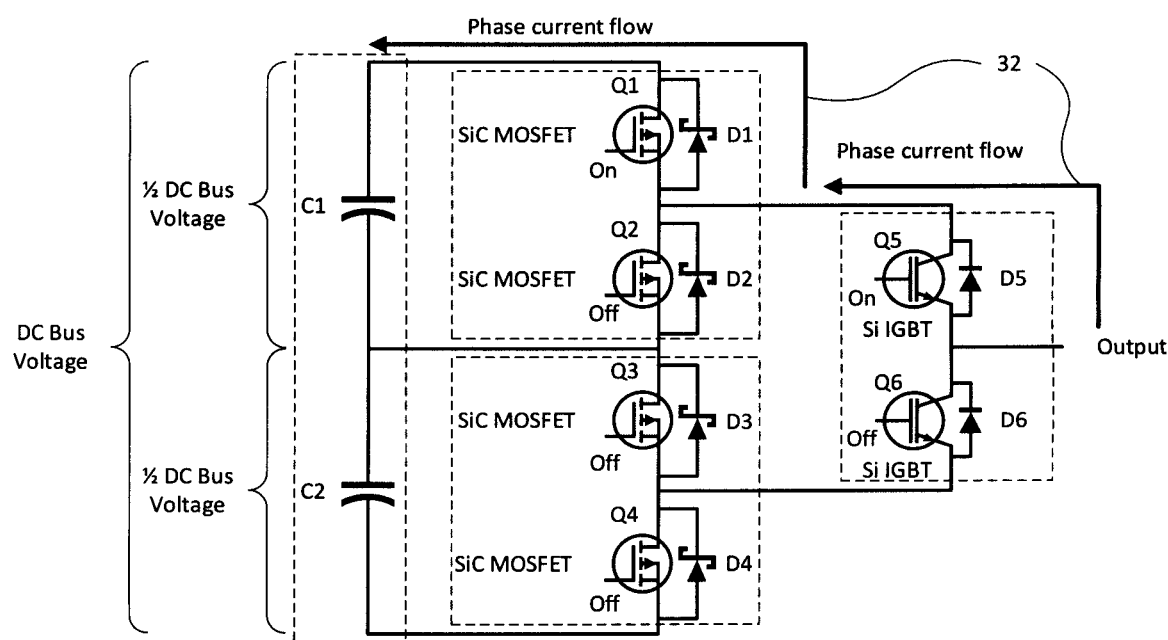
FIG. 4 is a circuit diagram of mixed device type ANPC topology further illustrating negative current flowing into the output for the upper bus structure initial state.
Figure 5:
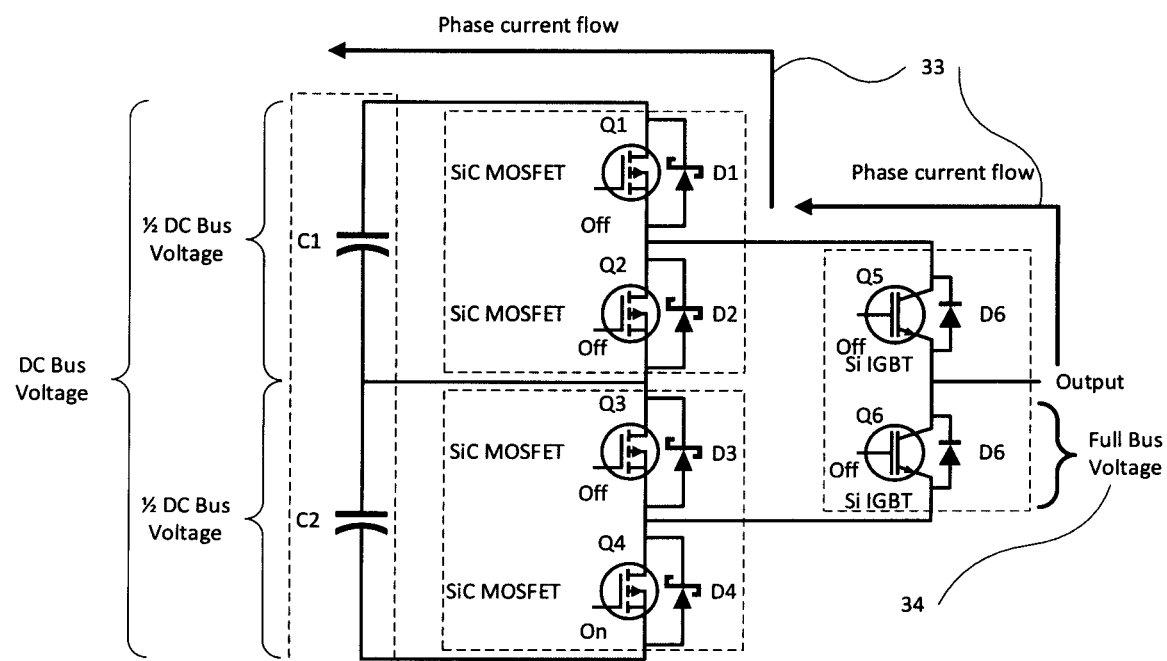
FIG. 5 is a circuit diagram of mixed device type ANPC topology commutation to lower bus structure resulting in full bus voltage applied to Q6.

As shown in FIGS. 4 and 5, mixed device types with different deadtime requirements lead to higher device voltage levels during switching (commutating) when a commutation of the slower switching devices (eg. IGBTs) takes longer than the higher frequency switching device (eg. SiC MOSFET).

Referring to FIG. 5, the commutation of the directional switching devices conducting current 33 takes longer than the faster PWM switches in the lower bus structure and results in full bus voltage 34 across Q6 before establishing the normal current flow 32 as was shown in FIG. 4. Similar results occur when transitioning from an operating state to the off state (eg. stop or fault condition) when all of the devices are commanded off at nearly the same time.

Figure 6:
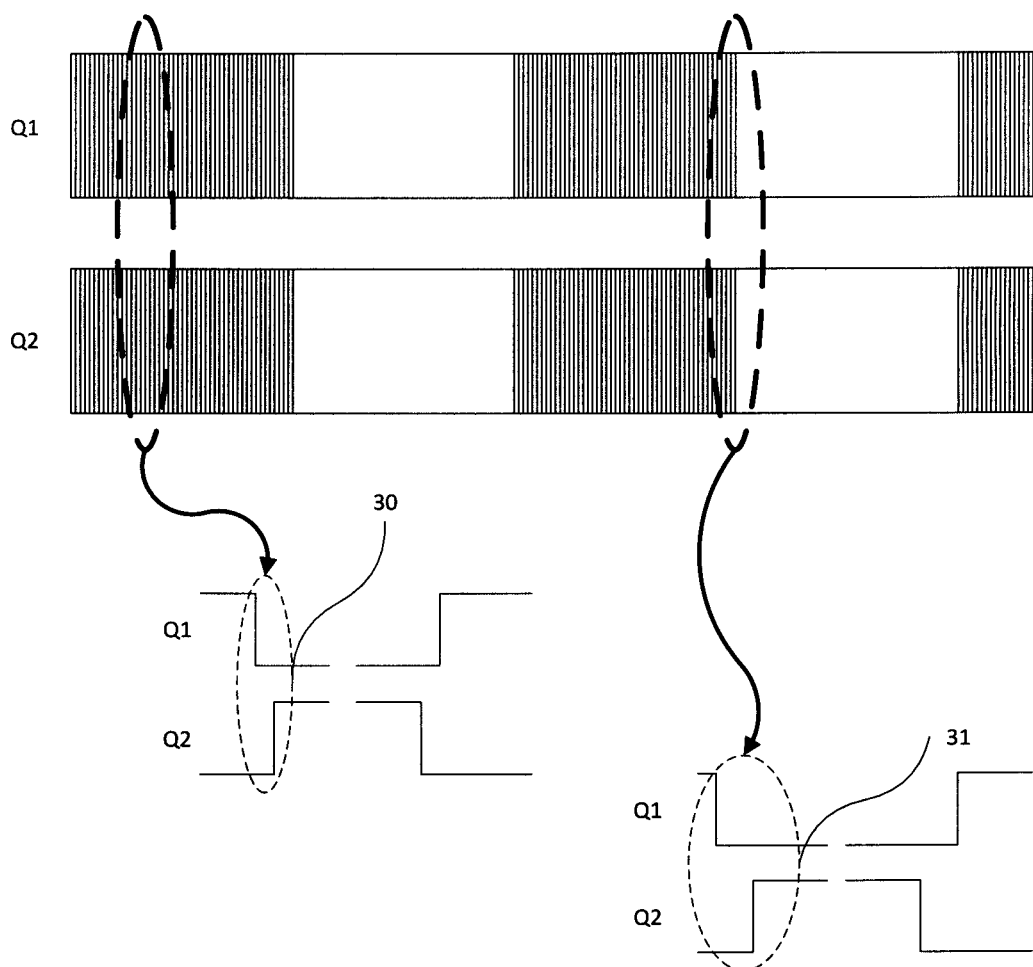
FIG. 6 is an exploded view of PWM pattern for Q1 and Q2 showing complementary switching and deadtime application when Q1 is turned off before Q2 is turned on and extended deadtime when Q5 and Q6 are switching.

As shown in FIG. 6, the undesired application of full bus voltage across the directional switches can be alleviated by insuring that the PWM switches are maintained in the off state for the duration of the commutation of the directional switches. In one example of this technique, the applied gate drive control deadtime is increased to the same time as that needed by the low frequency switching devices (directional switches) applied deadtime. By extending the high frequency switching devices deadtime 30 to the time required by directional switching devices 31 the upper bus structure and lower bus structure devices 35 are blocking voltage (turned-off) preventing the full bus voltage from being applied across a single directional switching device independent of the direction of current flow (i.e. conducting diode). As previously shown in FIG. 5, the otherwise undesired application of full voltage across the directional switches can also be mitigated by using full bus voltage rated devices for the directional switches Q5 and Q6 36. Using full voltage rated switching devices for the directional switches 35 still has a cost advantage over using high frequency devices for the directional switches. Normal deadtime requirements are utilized for the SiC MOSFETs 35 when the directional switching devices are not commutating as shown in FIG. 6. In a preferred embodiment, high frequency switching devices include SiC MOSFETs rated at 1200 VDC and the low frequency switching devices include IGBTs rated for 1700 VDC for a 1500 VDC full bus voltage. In this embodiment, IGBTs are able to sustain the full bus voltage of 1500 VDC in cases where the commutation resulted in full voltage across the directional switching devices.

Gate drive control signals are monitored and adjusted if they need further modification to insure that the upper bus structure devices and lower bus structure devices are maintained in the off state throughout the commutation period of the directional switching devices. This includes, but is not limited to, advanced timing for the application of the deadtime of the upper and lower bus structure switching devices. This also includes, but is not limited to, extended delay beyond the directional switching devices dead to insure that the high frequency switching devices are in the off state throughout the commutation period of the directional switching devices.

Referring again to FIG. 3, in a preferred embodiment, the SiC deadtime would be increased to 3.0 microseconds when the directional IGBT switches are commutating with an IGBT deadtime time of 2.5 microseconds. After the IGBT commutation has completed then the SiC PWM deadtime would be returned to 400 nanoseconds. Here the coordination of multiple deadtime times is implemented in a Field Programmable Gate Arrays (FPGA) and the PWM gate drive logical states are implemented in a microprocessor. In any case of this extended deadtime, the use of deadtime compensation is still appropriate for the control algorithms with modified compensation based on the actual applied deadtime. For example, a simple voltage compensation could increase the commanded voltage period by the deadtime delay of the high frequency devices when PWM is active, in this case by 400 nanoseconds. Also the voltage compensation would increase the commanded voltage period by the deadtime delay of the low frequency devices during the low frequency device commutation, in this case by 3.0 microseconds. There are many other voltage compensation techniques that would need similar modifications. Also, advantages of the mixed device type implementations for the ANPC topology are maintained in implementations utilizing multiple levels (series stages) of the ANPC topology, such as medium voltage power conversion.

Figure 7:
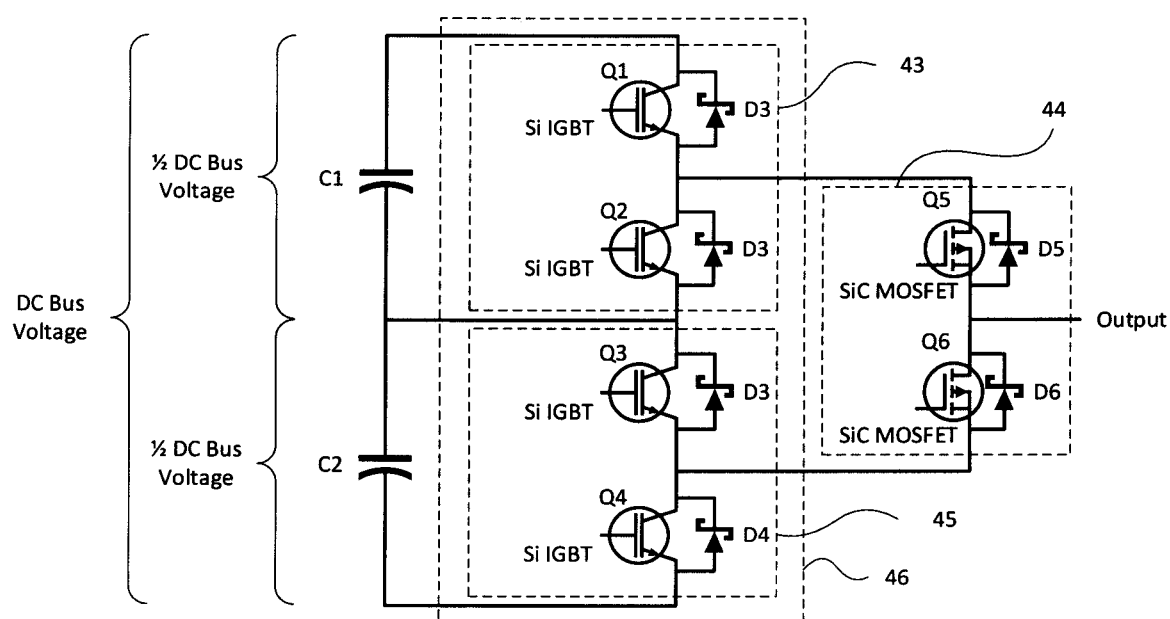
FIG. 7 is a circuit diagram of an alternative implementation of the ANPC topology with mixed devices.

FIG. 7 discloses an alternative ANPC topology with mixed device types upper bus structure 43 and lower bus structure 45 utilizing low frequency switching devices 46 for directional switching and high frequency devices for the PWM switches 44.

Figure 8:
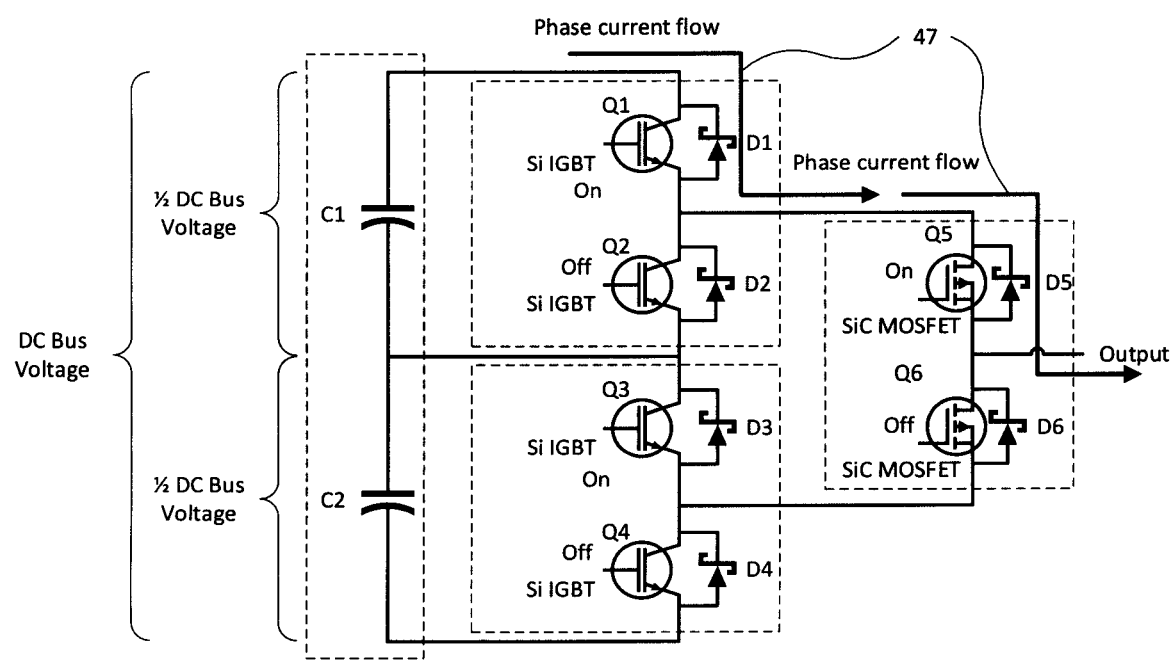
FIG. 8 is a circuit diagram of an alternative implementation of directional switches in mixed device type ANPC structure showing current flow for upper bus structure active positive output current, initial state.
Figure 9:
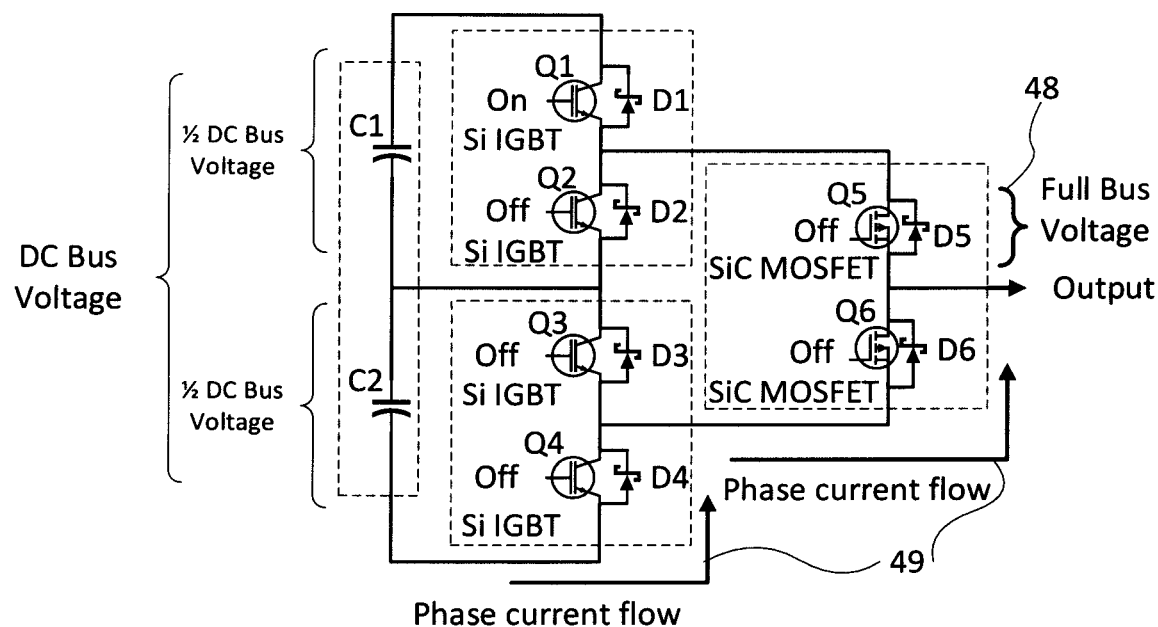
FIG. 9 is a circuit diagram of an alternative implementation of directional switches in a mixed device type ANPC structure showing commutation transition resulting in full bus voltage across Q5.
Figure 10:
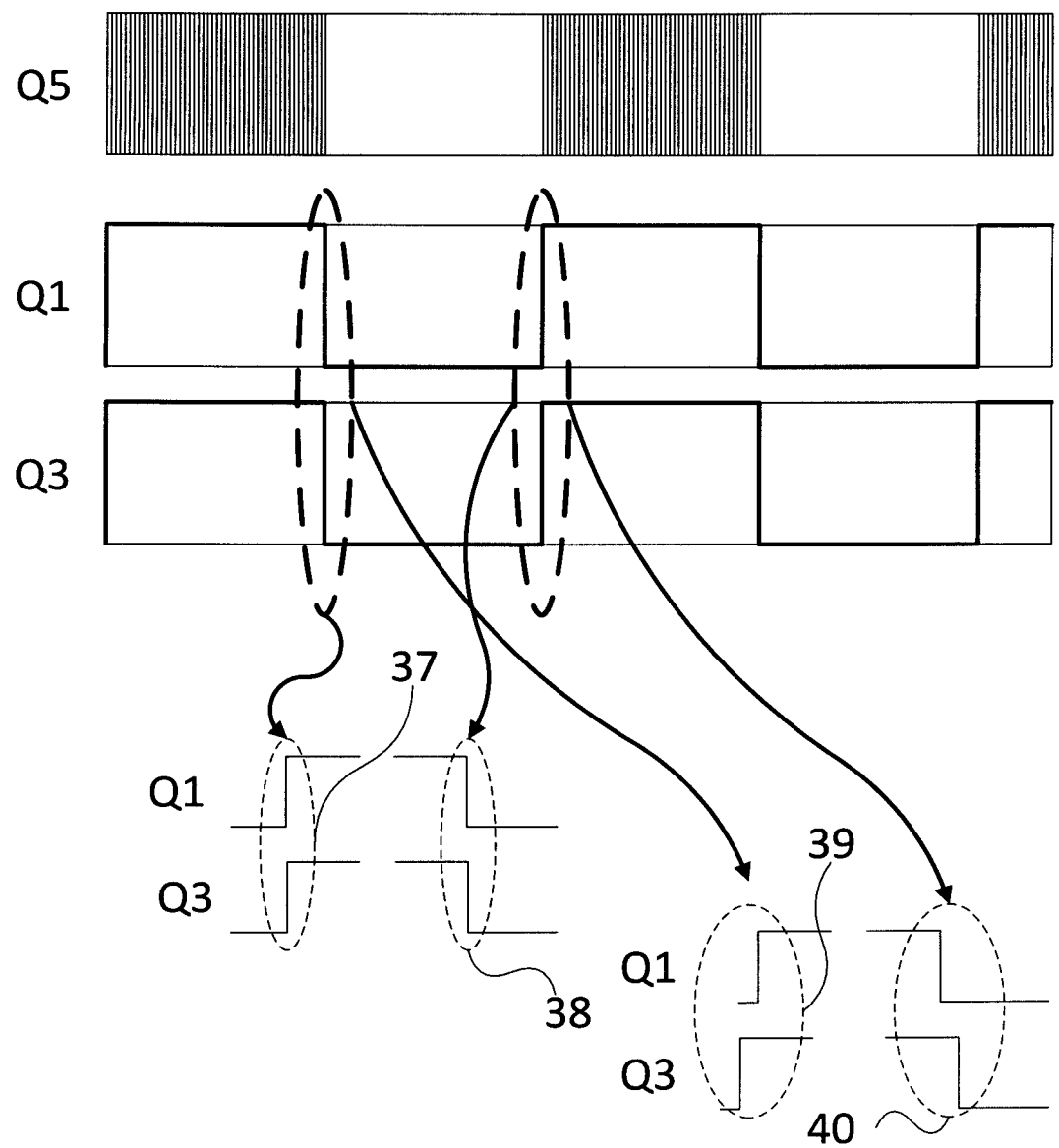
FIG. 10 is a graph illustration of an alternative implementation of directional switches in a mixed device type ANPC structure showing normal and modified switching pattern for Q1 and Q3.

Referring to FIGS. 8 through 10, with initial conditions showing positive applied voltage with positive current 47 before commutation. The commutation of Q1 and Q3 can result in full bus voltage 48 across Q5 with positive current 49 if the turn off transition of Q1 is delayed from the turn off of Q3 as shown in FIG. 9. The normal operation turn-off 37 and turn on 38 is modified so that Q3 turns on before Q1 for 39 and that Q3 turns off after Q1 40 is shown in FIG. 10. The same turn-on and turn-off operation is applied to Q2 and Q4 insuring that Q2 turns on before Q4 for turn-on operation and that Q2 turns off after Q4 turns off for turn-off operation.

Figure 11:
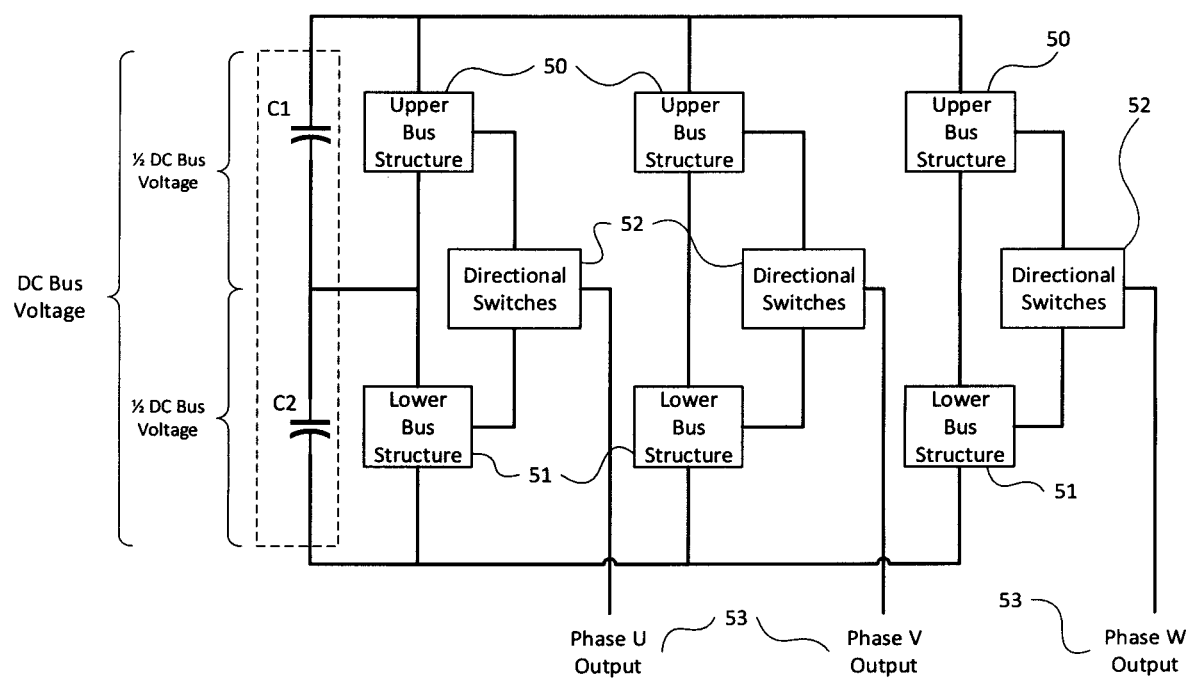
FIG. 11 is a circuit diagram of a three phase three-level mixed device type ANPC inverter structure.

FIG. 11 provides an example of a three phase 3L-ANPC implementation showing upper bus structures 50, lower bus structure 51 and directional switches 52 and phase outputs U, V and W 53. This multi-level ANPC implementation is applicable to any number of phases.

Figure 12:
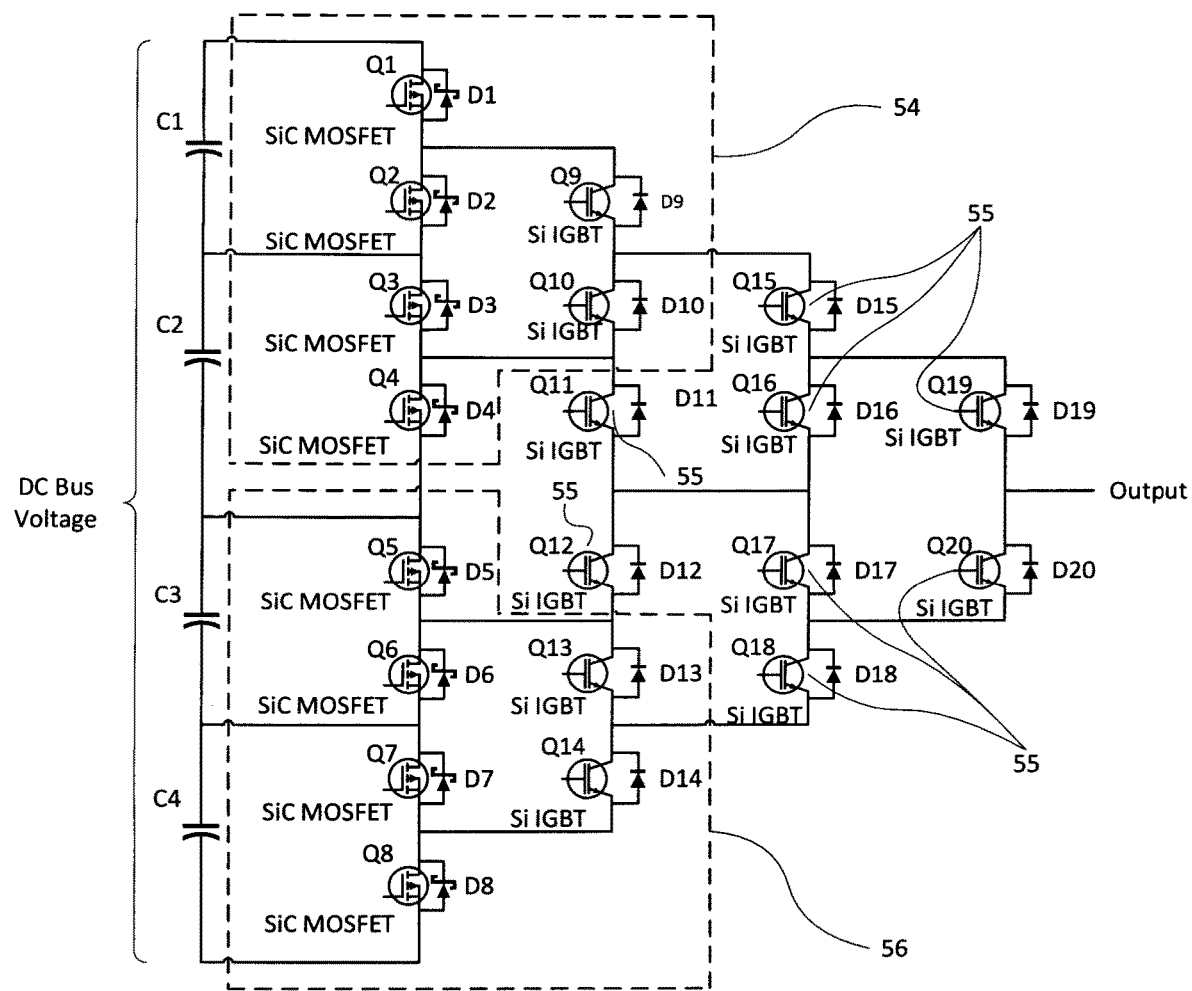
FIG. 12 is a circuit diagram of a two series 3L-ANPC mixed device type structures creating a 5L-ANPC structure for a medium voltage application.

FIG. 12 provides an example of two series 3L-ANPC stages 54 56 that create a 5L-ANPC structure for a medium voltage application. This example utilizes additional directional switches 55 to complete the 5L-ANPC implementation. There are many different implementations of the ANPC topology including any number of series 3L-ANPC stages that can benefit from the mixed device type implementations.

Figure 13:
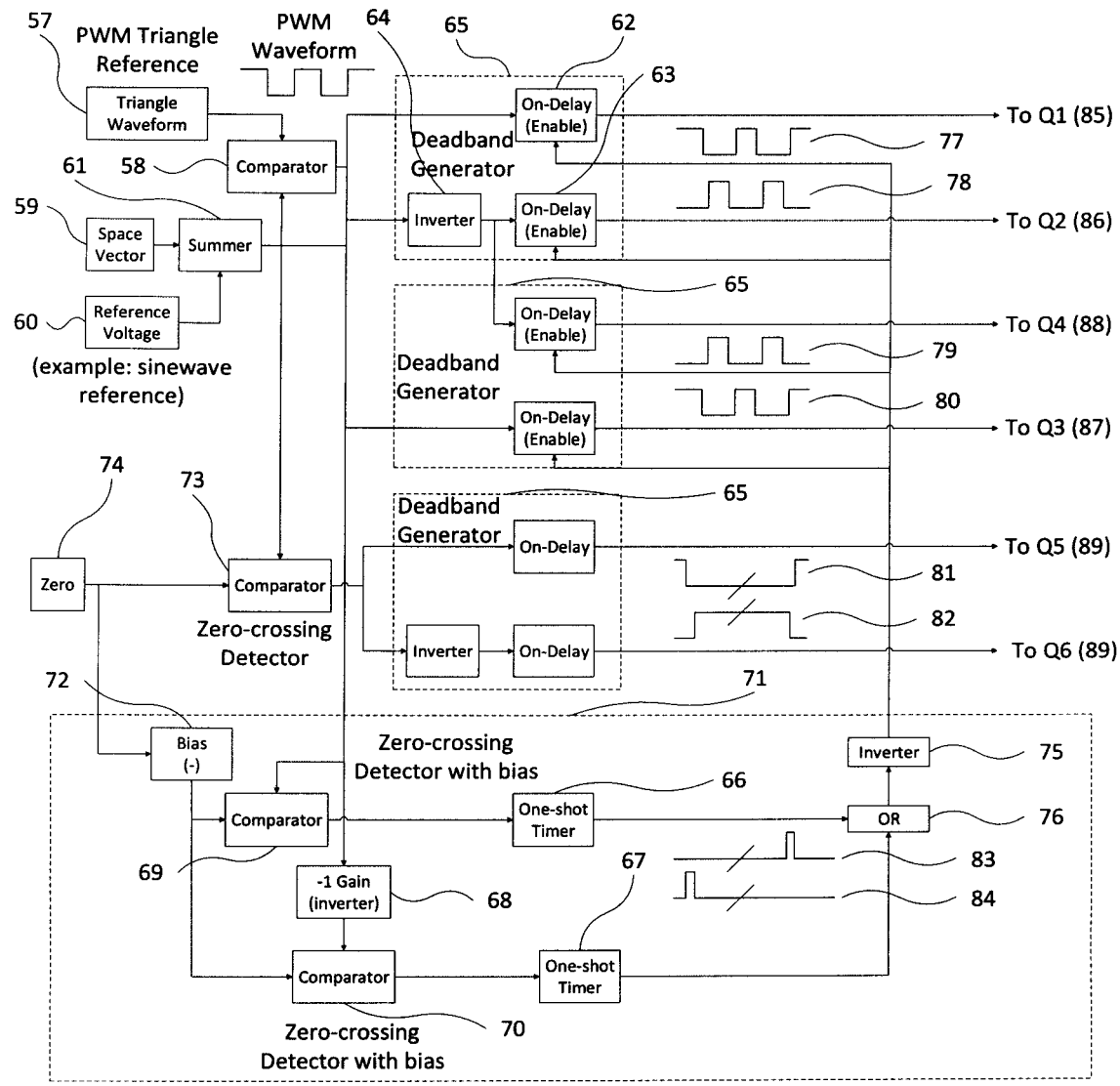
FIG. 13 is a circuit diagram of a mixed device type Multilevel Inverter Hardware Switching Device Controller Implementation.

FIG. 13 provides a diagram of a mixed device type Multilevel Inverter Hardware Switching Device Controller Implementation. It illustrates reference voltage, eg. sinusoidal fundamental, 60 that is modified through summer 61 for harmonic injection 59 (space vector modulation) or any of many other techniques to modify or compensate the PWM output. When the controller is in use, a PWM triangle waveform 57 is compared 58 to the reference voltage summer output 61, to generate a PWM output. Comparator 58 provides the PWM output that is used to commutate the upper and lower bus structure switching devices Q1 85, Q2 86, Q3 87, Q4 88. Deadtime is applied to the PWM signal that generates the complementary switching signals for the switching devices. The PWM output then becomes the input into an on-delay timer 62 and used to switch Q1 85 where the depicted PWM signal 77 shows the complementary deadtime. The PWM output is also inverted 64 and then becomes input into a complementary on-delay timer 63 and used to switch Q2 5 where the depicted signal 78 shows the complementary deadtime. The combination of the complementary on-delay timers is an implementation of a deadtime generator 65 for the upper bus structure switching devices. The Q1 85 signal is optionally used for Q3 87 and the Q2 86 signal is optionally used for Q4 88. In addition, PWM output is then optionally used as input into another deadtime generator to create complementary switching signals for the lower bus structure switching devices Q3 87 and Q4 88 where the complementary PWM signals are depicted 79, 80. The on-delay timers have an enable function that is used to turn off the upper and lower bus structure switching devices during the commutation of directional switching devices. Using two separate deadtime generators for the upper and lower bus structure switching devices allows the option of disabling the upper or low bus structure devices according to the active directional switching device (not shown).

Directional switching is generated by comparing 73 the reference voltage summer 61 output to zero 74 determining zero crossings. The zero crossing signal is used as input into a deadtime generator that provides complementary switching signals for the directional switches Q5 89 and Q6 90 where the complementary switching signals are depicted 81, 82.

Figure 14:
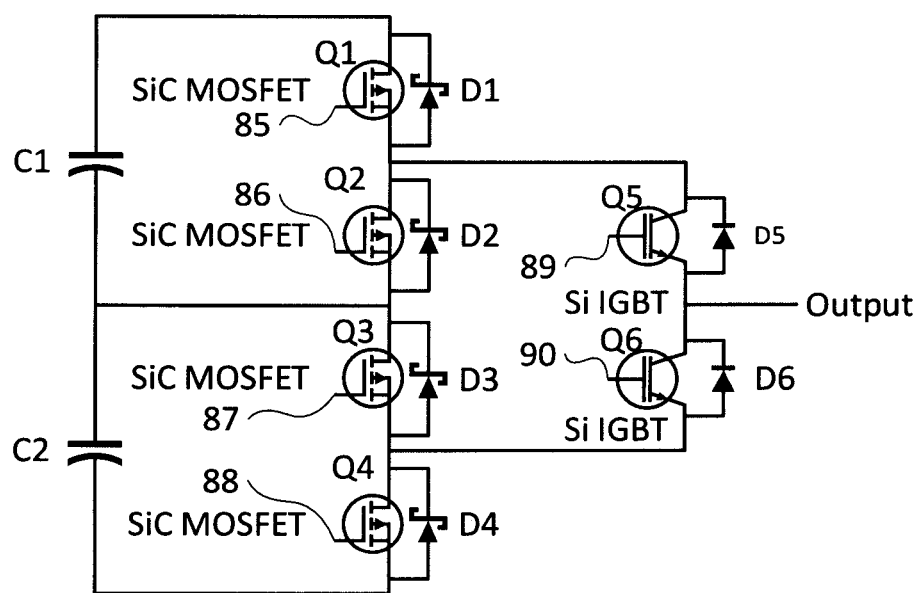
FIG. 14 is a circuit diagram of a multilevel inverter with mixed device types device reference.
Figure 16:
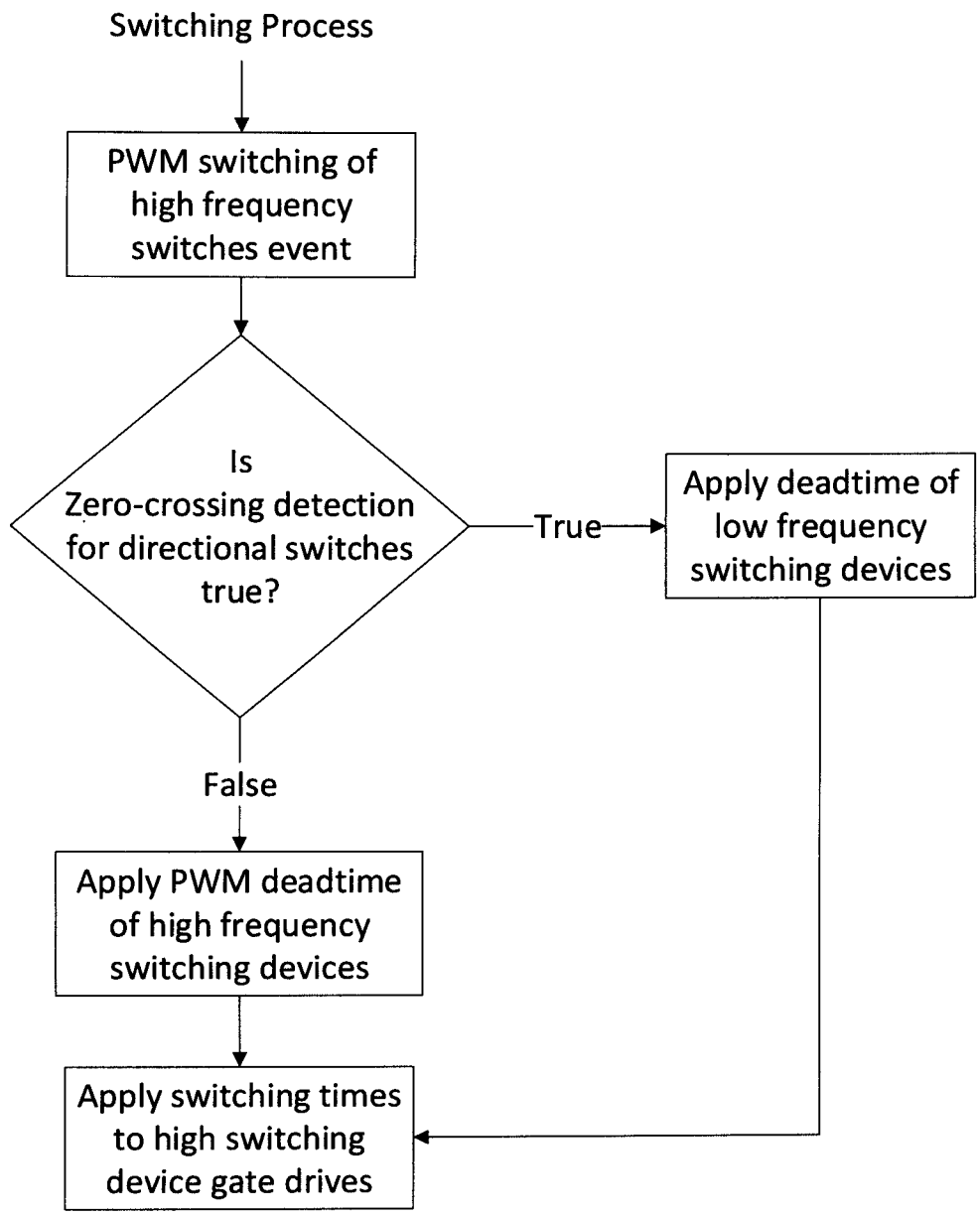
FIG. 16 is a flow chart of multilevel inverter with mixed device type switching process determination.

Reference voltage summer 61 output is compared 69 to zero 74 that has an optional bias 72 to generate the enable signals for the upper and lower bus structure switching devices Q1, Q2, Q3, Q4 The rising edge of the comparator 69 output triggers a one-shot timer 66 that generates a required disable time for the upper and lower bus structure switching devices. An optional zero bias 72 provides an advanced timing for the positive going directional switching device commutation. One-shot timer 66 provides a signal 83 that is coordinated with the directional switching devices deadtime with optional pre- or post-time extension. The reference voltage summer 61 output is inverted 68 (gain −1) and compared 70 to zero 74 with optional bias 72 to generate the negative going directional switching device commutation. One-shot timer 67 provides a signal 84 that is coordinated with the directional switching devices deadtime with optional pre- or post-time extension. The OR 76 of the positive 66 and negative 67 one-shot timer outputs is inverted 76 to provide the enable signals for on-delay timers for the switching signals for Q1, Q2, Q3 and Q4. Together the comparators 69 70, bias 72, gain 68, one-shot timers 66, 67, and logic blocks 75, 76 determine the enable signal generation 71 for the high frequency switching devices implementing the process shown in FIG. 16. Switching devices Q1 85, Q2 86, Q3 87, Q4 88, Q5 89 and Q6 90 are shown in greater detail in FIG. 14.

The controller outputs serve as the gate drive inputs for these switching devices and are described in terms of the switching devices Q1 through Q6, as previously shown in FIGS. 4 and 5, with initial conditions showing positive applied voltage with negative current 32 before commutation. The commutation of Q5 and Q6 can result in full bus voltage 34 across Q6 with negative current 33 if the turn off transition of Q4 is delayed from the turn off of Q6 as shown in FIG. 5. As described in FIG. 6, the low frequency switching device deadtime is applied to the high frequency switching devices during low frequency switching device commutation 31 preventing a delayed turn-off of Q4.

Figure 15:
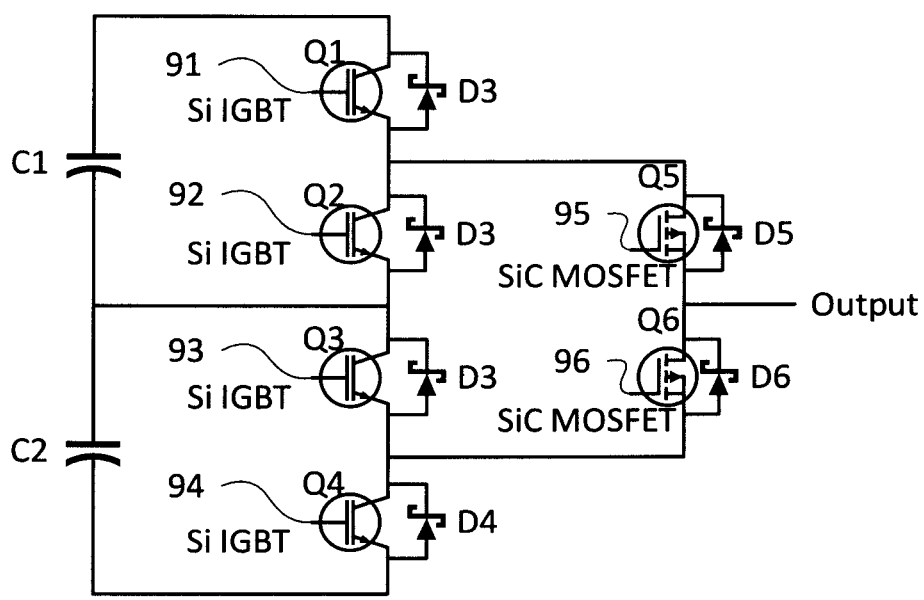
FIG. 15 is a circuit diagram of a multilevel inverter with mixed device types alternative implementation device reference.
Figure 17:
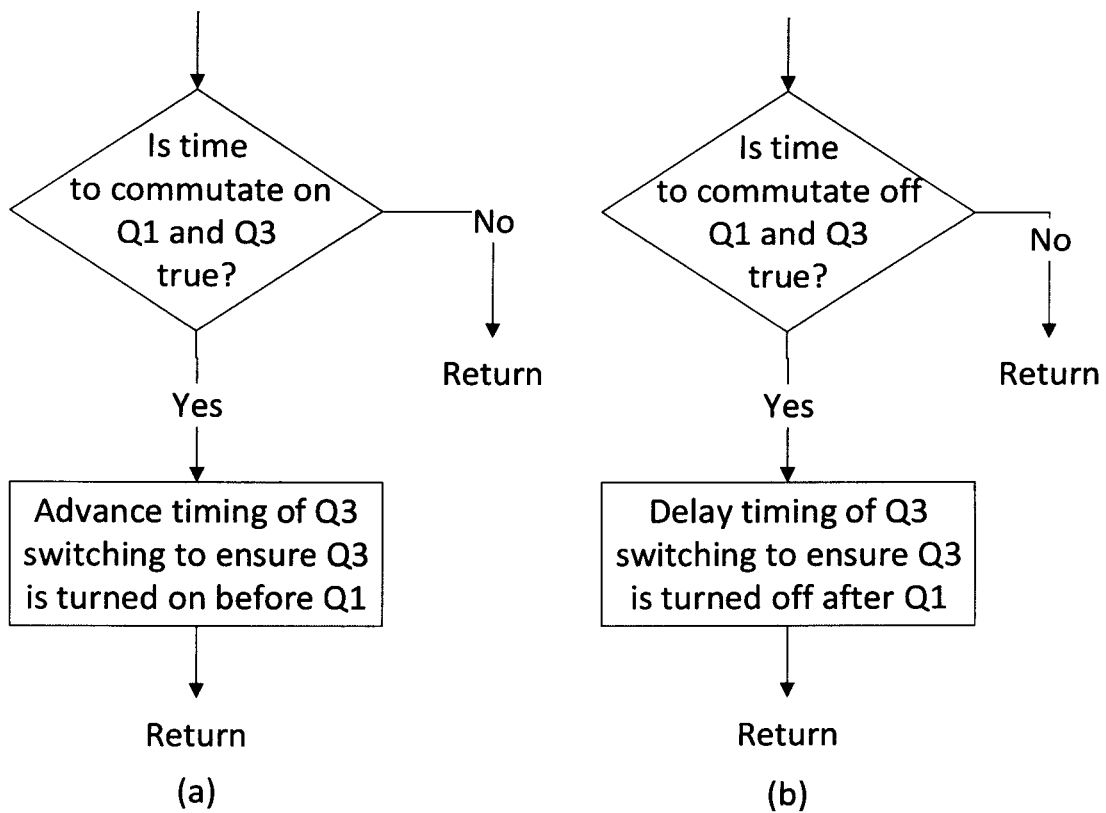
FIG. 17 is a flow chart of multilevel inverter with mixed device type alternative implementation process determination (a) switching on, (b) switching off.

In an alternate configuration shown in FIG. 15, operation of the directional switching devices Q1 91, Q2 92, Q3 93, Q4 94 must be coordinated such that Q3 93 turns on before Q1 91 as shown in FIG. 17 (a) and Q3 93 turns off after Q1 91 as shown in the process of FIG. 17 (b). Also, Q2 92 turns on before Q4 94 and Q2 92 turns off after Q4 94. Referring again to FIG. 13, this is implemented by providing a second set of enable signals 71, for the directional switches Q2 92 and Q3 93 that has a larger bias than the enable signals for Q1 91 and Q4 94. The larger bias for Q2 92 and Q3 93 insure that they are turned off before Q1 91 and Q4 94. Also, both of the one-shot timer's operations are extended for Q2 92 and Q3 93 to ensure that Q1 91 and Q4 94 turn off before Q2 92 and Q3 93 implementing the process shown in FIG. 17.

The scope of the invention is not limited to the specific embodiments described herein. Rather, the claims should be looked to in order to judge the full scope of the invention.

We claim:

1. A method of controlling a mixed device type multilevel inverter hardware switching device comprising the steps of:
   a) generating a reference voltage;
   b) comparing a PWM triangle waveform to the reference voltage to generate a PWM output;
   c) providing the PWM output to commutate the upper and lower bus structure switching devices;
   d) providing an on-delay timer and a complementary on-delay timer, each of which has an enable function that turns off the timer's output;
   e) inputting the PWM output to the on-delay timer to generate a complementary deadtime;
   f) using the complementary deadtime to generate complementary switching signals for the switching devices;
   g) providing the PWM output as input into the on-delay timer to switch Q1;
   h) inverting the PWM output to use as input into the complementary on-delay timer to switch Q2;
   i) comparing the reference voltage to zero to create directional switch outputs;
   j) inverting the directional switching signals to create complimentary directional switching;
   k) inputting the directional and complementary directional switching signals into the on-delay timer and the complementary on-delay timer to create deadtime for the directional switches;
   l) using logic elements to create enable signals for the upper and lower bus structure devices implementing extended deadtime for the PWM devices when the directional switches are commutating; and,
   m) using optional bias to provide pre- or post-extended deadtimes.

* * * * *